US 9,754,187 B2

(12) United States Patent
Panferov et al.

(10) Patent No.: US 9,754,187 B2
(45) Date of Patent: Sep. 5, 2017

(54) DATA CAPTURE FROM IMAGES OF DOCUMENTS WITH FIXED STRUCTURE

(71) Applicant: ABBYY Development LLC, Moscow (RU)

(72) Inventors: Vasily Vladimirovich Panferov, Moscow Region (RU); Andrey Anatolievich Isaev, Moscow Region (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 135 days.

(21) Appl. No.: 14/571,979

(22) Filed: Dec. 16, 2014

(65) Prior Publication Data
US 2015/0278593 A1 Oct. 1, 2015

(30) Foreign Application Priority Data
Mar. 31, 2014 (RU) .................. 2014112237

(51) Int. Cl.
*G06K 9/18* (2006.01)
*G06K 9/62* (2006.01)
*G06K 9/00* (2006.01)

(52) U.S. Cl.
CPC ....... *G06K 9/6255* (2013.01); *G06K 9/00483* (2013.01); *G06K 2209/01* (2013.01)

(58) Field of Classification Search
None
See application file for complete search history.

(56) References Cited

U.S. PATENT DOCUMENTS

| 6,886,136 | B1 | 4/2005 | Zlotnick et al. |
| 6,912,308 | B2 | 6/2005 | Reintjes et al. |
| 7,054,509 | B2 | 5/2006 | Rom et al. |
| 7,149,347 | B1 | 12/2006 | Wnek |
| 7,421,126 | B2 | 9/2008 | Deere |
| 7,607,078 | B2 | 10/2009 | Geva et al. |
| 2008/0008391 | A1 | 1/2008 | Geva et al. |
| 2012/0076413 | A1* | 3/2012 | Ferman ............ G06K 9/00469 382/176 |

FOREIGN PATENT DOCUMENTS

WO WO/2005/122062 12/2005

OTHER PUBLICATIONS

U.S. Appl. No. 14/644,752, filed Mar. 2014, Ohguro.*

* cited by examiner

*Primary Examiner* — Mark Roz
(74) *Attorney, Agent, or Firm* — Lowenstein Sandler LLP

(57) ABSTRACT

For extracting data from a document with fixed structure, we recognize key words in an image of the document; identify reference object based on these key words, create templates based on the identified reference objects; match the created templates against the image of the document while recognizing fields in the image of the document these templates; and select the best template using quality of the recognized field.

45 Claims, 13 Drawing Sheets

DATA CAPTURE FROM IMAGES OF DOCUMENTS WITH FIXED STRUCTURE

CROSS REFERENCE TO RELATED APPLICATIONS

This application claims the benefit of priority under 35 USC 119 to Russian Patent Application No. 2014112237, filed Mar. 31, 2014; the disclosure of which is incorporated herein by reference in its entirety.

FIELD OF THE INVENTION

The present invention relates in general to data capture by means of Optical or Intelligent Character Recognition (OCR/ICR), and specifically to a method and system for creating structure description for image of documents with fixed structure.

DESCRIPTION OF THE RELATED ART

Generally data from paper documents is captured into a computer database by means of a dedicated data capture system, which converts paper documents into electronic form (by scanning or photographing documents, etc) and extracts data from fields within the image of the document.

To extract data from the document image, data capture systems should be provided with information regarding fields in the document image from which data will be captured. The information may comprise locations of the fields in relation to, for example, boundaries of the document or other reference objects, etc. The mentioned above information is called a "template" or a document structure description.

Usually document structure descriptions (templates) are created in advance by human experts for each type of documents. Such document descriptions (templates) are loaded into the data capture system and applied to incoming documents images. The document structure descriptions (template) are matched against the incoming document images, and the data from the incoming document image is extracted. The main shortcoming of the existing dedicated data capture systems is that they are inadequate for quickly creating document structure description (template) for various types of documents and automatically capturing data, so they may be not implemented in cases, when there are many different types of incoming documents to be automatically processed and there is no possibility to create the new templates manually.

Besides nowadays mobile devices (e.g., smart phones, mobile phones, tablet computers, personal digital assistants, etc.) are becoming increasingly available worldwide. Moreover, mobile devices are becoming and more powerful. They are always at hand and their capabilities are comparable with PC capabilities. As a result, the mobile electronic devices have become indispensable assistants in business, education, communication, in travel or in everyday life. Especially since most mobile electronic devices have embedded photo and/or video cameras, they may be used for capturing of images with high quality and for extracting data from these images.

Also in today's society, wide use is made of so-called documents with fixed structure". For example, such documents include driver's licenses, identification cards, checklists, contracts, etc. Document with fixed structure may be rigidly structured in that, for example, fields pertaining to information contained in the document always appear in the same place. With reference to driver's licenses, for example, the fields for "first name," "last name," and "date of issue" may appear in the same locations for each license, although data that correspond to these field may vary for different holder of driver's licenses. There exists an increasing need for quick and mobile capture of data from such documents with fixed structure.

With the proliferation and widespread use of documents with fixed structure, there is a corresponding continuing need to accurately and efficiently extract the data contained in such documents with a corresponding high degree of repeatability and speed. Nowadays only dedicated devices allow for processing and extraction of data from such document images. These dedicated devices, however, are generally immobile and otherwise tied to stationary devices. Currently, there is no mechanism by which data from image of documents with fixed structure may be rapidly extracted in a mobile setting, such as a security checkpoint. The disclosed method doesn't need a PC (or other dedicated system for data extraction) and may be used with any handheld device with a digital photo camera.

In addition to the foregoing, frequently in order to extract data from an image of a document with fixed structure, it is necessary to pre-process the document from which data is to be extracted in a special manner. In one example, the document to be processed can be adapted by adding in advance special machine-readable references, such as black squares at the corners of the document. Advantageously, the disclosed method does not need a stage of manual preparation of incoming document; it may be used for any random printed documents like a license, a contract, a check etc. As one of ordinary skill in the art will appreciate, circumstances of a particular situation may not allow for setup processes of a particular document in this manner, as in many cases documents' images from which data is to be extracted are foreign to the system performing the data extraction. A need exists for a mechanism whereby data may be efficiently and quickly extracted from images of documents with fixed structure in environments such as mobile settings, while alleviating the necessity of setup pre-processing as previously described. Disclosed method does not need a trained human expert to develop and adjust document image processing. Any user may perform it.

To address this need, various embodiments for data capture from images of documents with fixed structure are provided. In one embodiment, by way of example only, a method for data capture from an image of a document with fixed structure using a processor device is provided. A selected one of a plurality of templates is matched against the document image to extract the data. The template matching uses at least one reference object or anchor specifying at least one area in the document image where the data is to be captured.

SUMMARY OF THE DESCRIBED EMBODIMENTS

In one aspect, the present disclosure is related to a method for data capture from an image of a document with fixed structure using a processor device. The method includes acquiring an electronic image of a document with fixed structure. The method further includes recognizing key words in the image of the document and identifying at least one reference object based on the recognized key words, where the at least one reference object specifies at least one area in the image of the document with fixed structure where the data is to be captured. In some implementation the reference object may be a regular expression. In some implementation the method may include creating one or more templates based on the identified reference objects. Then matching templates from a plurality of templates against the document with fixed structure using identified at least one reference object is performed. Plurality of templates may include a preexisting template. Further the method includes selecting a template from the plurality of templates using quality of the recognized key words. The selecting the template may be based on quality of the template matching. The method may include performing additional recognition the image of the document using the selected template. In some implementation recognizing the image of the document is based on additional information about the key words. The method further includes extracting data from the image of the document using the selected template.

In some implementation the method may further comprise for each template computing a quality of a match of the template with the image of the document with fixed structure, identifying the templates of the plurality of templates which have the quality of the match greater than a predetermined threshold and retaining the identified templates.

Moreover in according to the described invention a quality of recognized text in the recognized key word is computed. The computed quality is compared with the threshold value. If the quality of recognized text is greater than a threshold value, the recognized text is exported.

In some implementations the method includes performing a distortions correction of the image of the document with fixed structure. Performing the distortions correction may be an alignment of lines, correction of skewing, correction of geometry of the document, color correction, restoring blurred and unfocused areas, and removing noise. In some implementations the method may apply at least one filter to the image of the document.

In addition to the foregoing embodiment, other exemplary system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, the implementation and use of documents with fixed structure in today's society has continued to proliferate. Identification documents, licenses, checklists, contracts, and the like are found in virtually every facet of life. Currently, while dedicated mechanisms exists for extraction of information by means of OCR/ICR systems contained in document with fixed structure, such functionality is tied to stationary systems, and a mechanism for efficient data capture from images of documents with fixed structure in a mobile setting, without the necessity of setup pre-processing steps on an image of the document with fixed structure, is presently unavailable.

To address the need for such functionality, various embodiments of the present invention provide mechanisms for efficient extraction of data from images of documents with fixed structure in such environments as mobile settings without necessitating pre-processing setup steps. These mechanisms allow for extraction of data from digital images of documents with fixed structure, for example, without using a dedicated system for data extraction, such as a PC, besides these mechanisms may be used with any handheld device having a digital photo camera.

Here again, the structured documents may include identification cards, driver's licenses, or checklists of various types. The mechanisms of the illustrated embodiments allow for the determination of the type of a given incoming document image, a further determination of the location of the fields that hold the data to be captured, and the ability to capture these data in editable form (for example, text form).

The mechanisms of the illustrated embodiments described herein do not require special preparation of the document with fixed structure to extract the information. With relatively little time spent describing the document type, the mechanisms allow for reliable data capture. Disclosed method doesn't require a trained employee to develop and adjust processing of incoming document images. Any user may perform this task. Furthermore, it should be noted that the mechanisms described below do not require the preliminary preparation of documents, namely the implementation of special reference squares or any other reference points such as crosses, corners, and so forth. Finally, the mechanisms of the illustrated embodiments are resistant to various types of geometric and color distortions, for example that may be introduced by the photography or scanning process. The mechanisms may function for documents for which there is little text that is unchanged in differing images of this type, and does not require special markings to position the template precisely.

Figure 1:
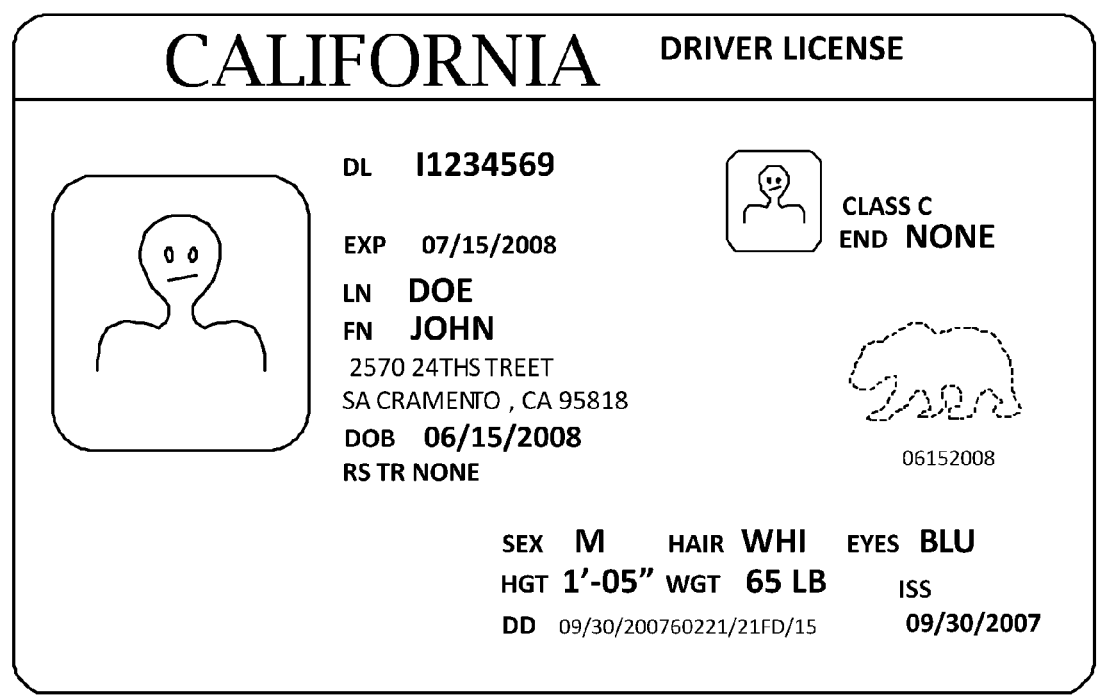
FIG. 1 is an illustration of an exemplary document with fixed structure, specifically a California driver's license document, in which aspects of the present invention may be realized.

Turning to FIG. 1, an exemplary document with fixed structure 100 is depicted, specifically a California state driver's license for driver John Doe. As is shown, document with fixed structure 100 contains various fields of data, such as license number (DL), expiration (EXP), class (CLASS), last name (LN), first name (FN), Date of Birth (DOB), restrictions (RSTR), sex (SEX), and the like. Each of these fields of data is found at approximately the same location in the document for each holder of a driver's license in the State of California. As one of ordinary skill in the art will appreciate, the information contained in each of the data fields of California state driver's license will vary according to the particular holder, such as license number, expiration, and the previously mentioned fields.

A holder may present document 100 to a person desiring to validate the information contained in the document quickly and efficiently. For example, the document 100 may be presented to a person of authority in a checkpoint or other mobile setting. It is desirable that a mechanism be put into place to efficiently, rapidly, and accurately extract the information contained in the document with fixed structure 100 for various purposes as previously described.

Figure 2:
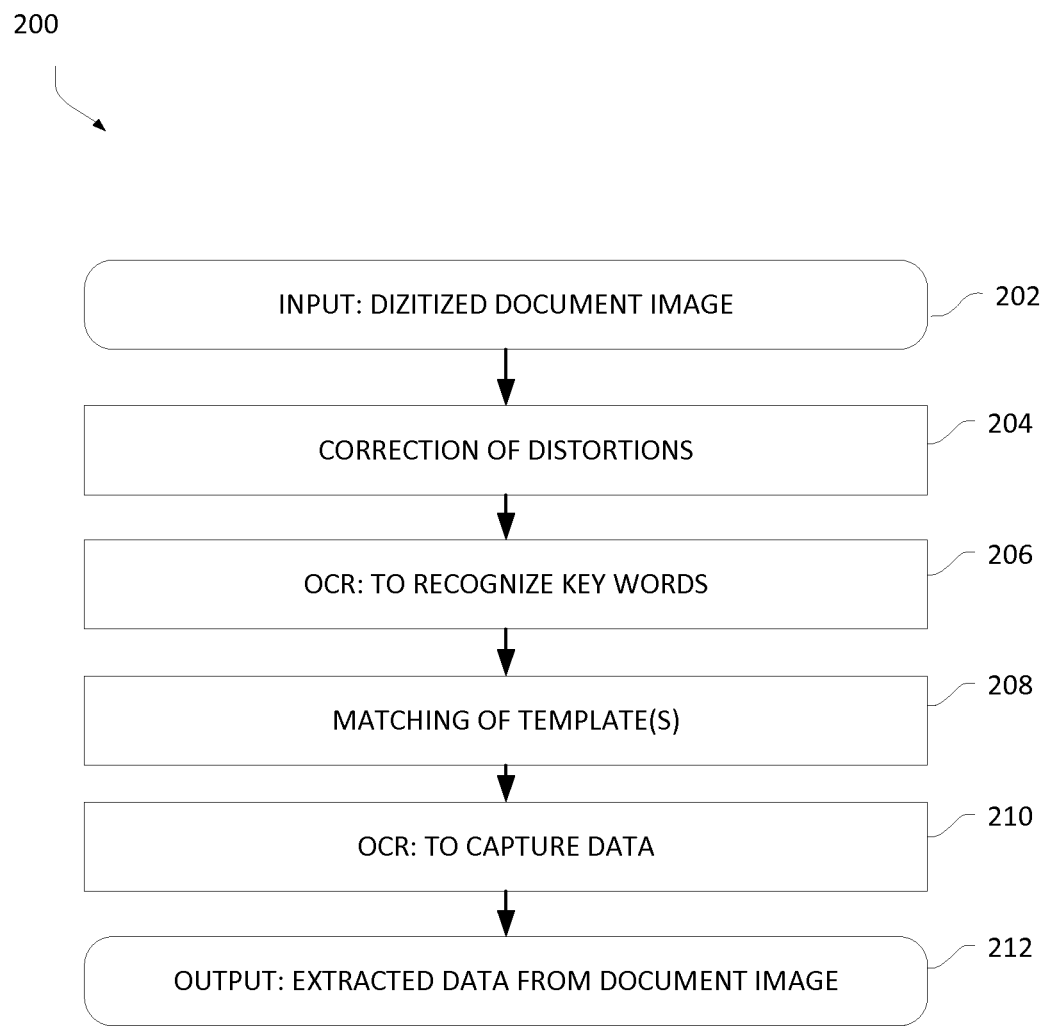
FIG. 2 is a flow chart diagram illustrating an exemplary method for extracting data from an image of document with fixed structure, in which aspects of the present invention may be realized.

Turning now to FIG. 2, an exemplary method 200 for extracting data from documents with fixed structure is shown, in which aspects of the present invention may be realized. Method 200 begins at an input stage 202, where the document is digitized, so the electronic image of the document is obtained. The electronic image of document may be a photo, scan, or other digital representation. As a following step 204, distortion correction operations may be performed on the digital image, such as correction of geometric, color, or other distortions as will be further described. In one embodiment at this step (204) several versions of the initial image may be obtained.

In a subsequent step, the method uses OCR systems to recognize and locate "key" words (step 206) on the image(s) of document obtained at step 204. In one embodiment, all of the recognized key words are found in a key word database.

These recognized key words become reference objects or anchors, which are then used to identify spatial location(s) of fields in the image of the document with fixed structure where data will be later read and captured, again as will be later described in more detail. Besides, based on information about key words, a description of the type of document may be created. This description may hereafter be referred to as a template. So for different images of documents at the step (206) several templates may be created. These created templates may be stored in a memory of electronic devices or in other memory storage and can be used for performing data capture on subsequent incoming images of documents. In a following step (208), a template (or a plurality of templates) is matched against the electronic image of the document (202), wherein the template(s) may be chosen from the templates that has been created based on the key word information at step 206 or from templates that were previously stored in the memory of the data capture system.

As will be further described, the step of matching a selected template may be repeated until a template most appropriate for the document image is determined. The data is then captured through the matched template (step 210), and if the data is determined to be accurate, the data is extracted as output (step 212).

Figure 3:
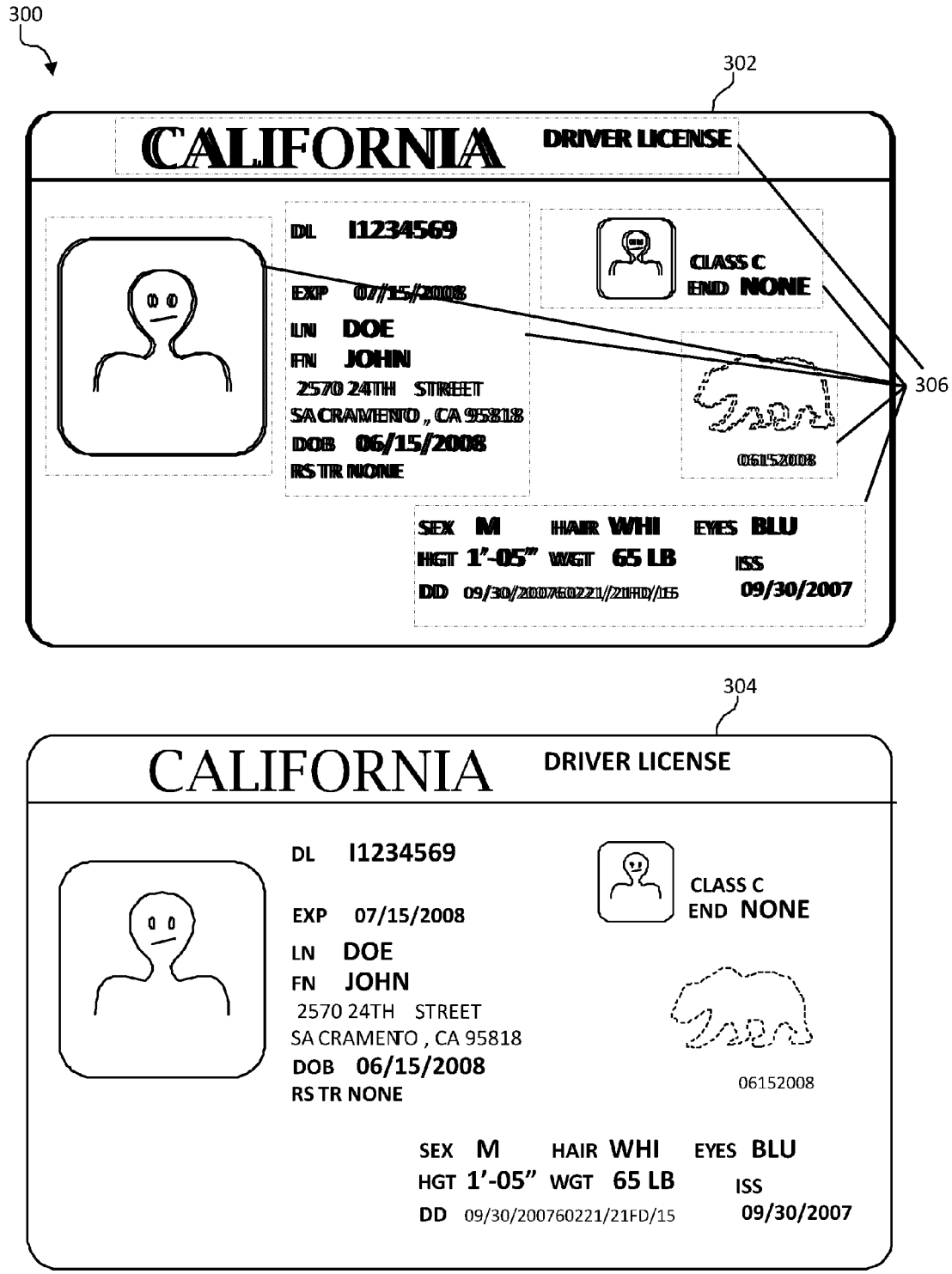
FIG. 3 is an illustration of distortion correction operations performed on an exemplary image of document with fixed structure in a before and after state, again in which aspects of the present invention may be realized.

Turning to FIG. 3, following, an illustration 300 of distortion correction operations is shown in an exemplary embodiment. Illustration 300 includes a digitized version of document image 302, which has a corresponding number of blurred areas 306. After processing the image 302, the blurred areas 306 are restored, and the image 304 results, wherein blurred regions and other distortions are restored.

In some implementations of the invention, the document image 202 is processed with defect-correction methods to identify and remove such defects as blurriness, being out-of-focus, or excessive noise. Some of the defect-correction methods are described in U.S. Patent Application Publication No. 2012-0243792 "Detecting and Correcting Blur and Defocusing".

Figure 4A:
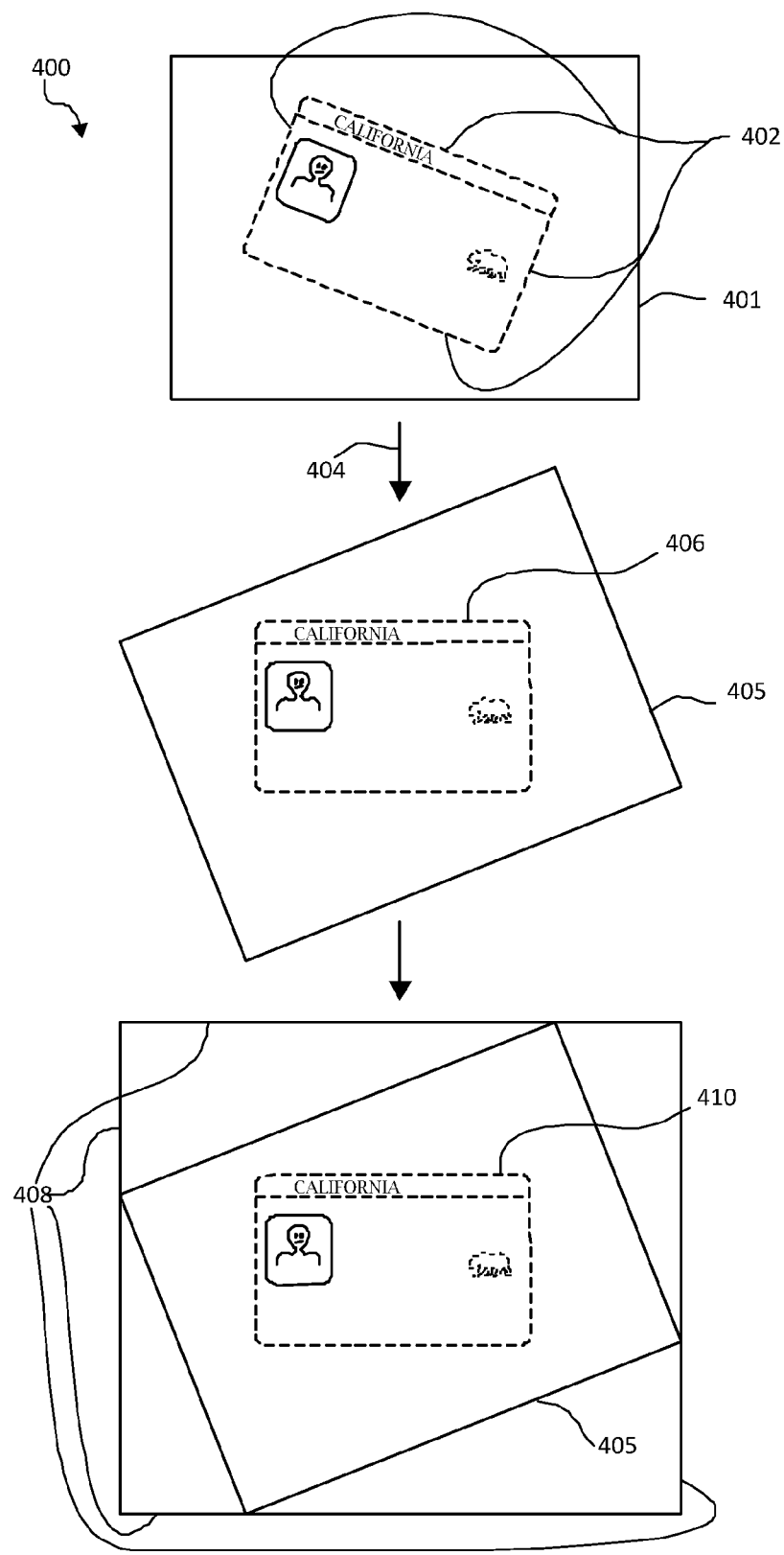
FIG. 4A is an additional illustration of distortion correction operations performed on an exemplary image of document with fixed structure, specifically geometric distortion correction, again in which aspects of the present invention may be realized.

A further one of the possible examples of correction of geometric distortions 400 is demonstrated in FIG. 4A. First, document 402 within image 401 is identified. The document 402 has geometric distortions (non horizontal orientation) and needs to be turned at some certain angle through step 404 as shown. The resulting image 405 contains a properly oriented document with fixed structure 406. Identifying of document's boundaries may be performed using one of known methods, for example, as described in patent application Ser. No. 14/162,694 entitled "AUTOMATIC CAPTURING OF DOCUMENTS HAVING PRELIMINARILY SPECIFIED GEOMETRIC PROPORTIONS". The rotated image 405 may be manipulated until the image 405 is a geometrically proper rectangle with boundaries 408 as shown. The properly oriented image 410 of the document without distorted lines will be located in this rectangle 408.

Figure 4B:
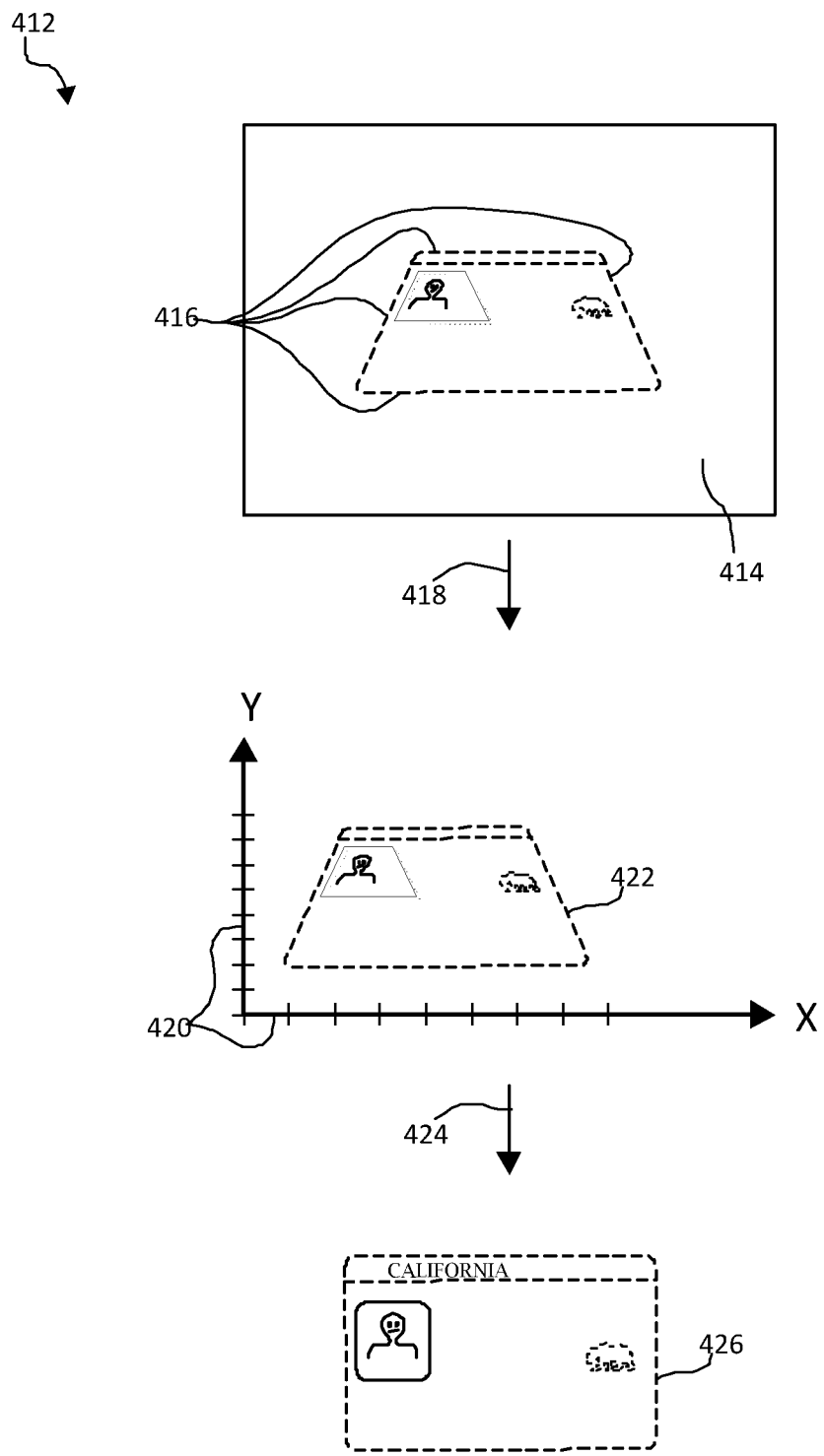
FIG. 4B is an additional illustration of geometric distortion correction operations performed on an exemplary image of document with fixed structure, here again in which aspects of the present invention may be realized.

FIG. 4B depicts a further example of correction of geometric distortions 412 as shown. FIG. 4B shows a document with fixed structure with a perspective that is distorted from a rectangular view (deviating from rectangular form, trapezoid form) 416. This image may be manipulated, for example, by cropping (418) the identified distorted document (416) along the document's boundaries from its background (414) and then by subsequent compressing and stretching (424) the cropped document (422) along the corresponding coordinate axes (420). The result is a document with the distortions in the perspective corrected (426) and now the document image is suitable for further analysis.

Template:

The following paragraphs describe mechanisms of creating templates in further detail. As previously described, our invention includes a preparation of a description of type(s) of the document undergoing data capture and associated field(s). For each new type of document, it is necessary to prepare a structure description or a template of the document.

In one embodiment, the template may include two portions: a description of the text in the document, and a description of the fields that are to be recognized and captured. The templates may be prepared semi-automatically with user's participation. All of the data may be stored in any form suitable for use with an OCR engine, such as in a traditional XML format or in other formats.

Returning briefly to FIG. 2, step 202 describes receiving a digital document image, while step 204 describes performing correction of geometric, color, and other distortions. One or more of images may be obtained, although it should be noted that obtaining just one master digital document image is usually sufficient to utilize various mechanisms of the present invention. If there are any geometric, color, or other distortions of this image, they can be automatically or manually corrected so that the image is converted to a rectangle similar to what would be obtained if this document was scanned without distortions. In addition, one could even utilize one master image of the document with fixed structure without any geometric or color distortions for creating a template.

The template has information about the text, its dimensions (optional) and its location in the initial image of the document. Template also contains information about the fields that need to be extracted and information about their coordinates. Information about the text is stored in the form ("word", coordinates of the word) where a "word" might be a text or a common expression. As was mentioned above, template is matched against the incoming document images and the documents are processed using the template to capture the information in these incoming document images, or in other words to capture data.

Template Creating:

The templates, in one embodiment, may be created by recognition at step 206 (FIG. 2) of "key words" in the images of the documents. A key word may be, for example, a combination of letters "first name" or "last name" (or "FN" or "LN"), or a date ""$$.$$.$$$$" where $ is any digit. These words may be used as reference objects for specifying the areas where there is data to be captured. It is important to note that the disclosed invention may not require special reference points placed in advance, like black squares or similar symbols, to capture data. Within the framework of the mechanisms described herein, ordinary words, dates and other annotations in the document are used as "reference objects" or anchors instead of special symbols. The recognition of key words may be performed on any portable electronic device (such as mobile devices, smart phones, etc), and does not necessitate high bandwidth or processing requirements. For example, such recognition may be performed, in one embodiment, using fast mode OCR.

Figure 6:
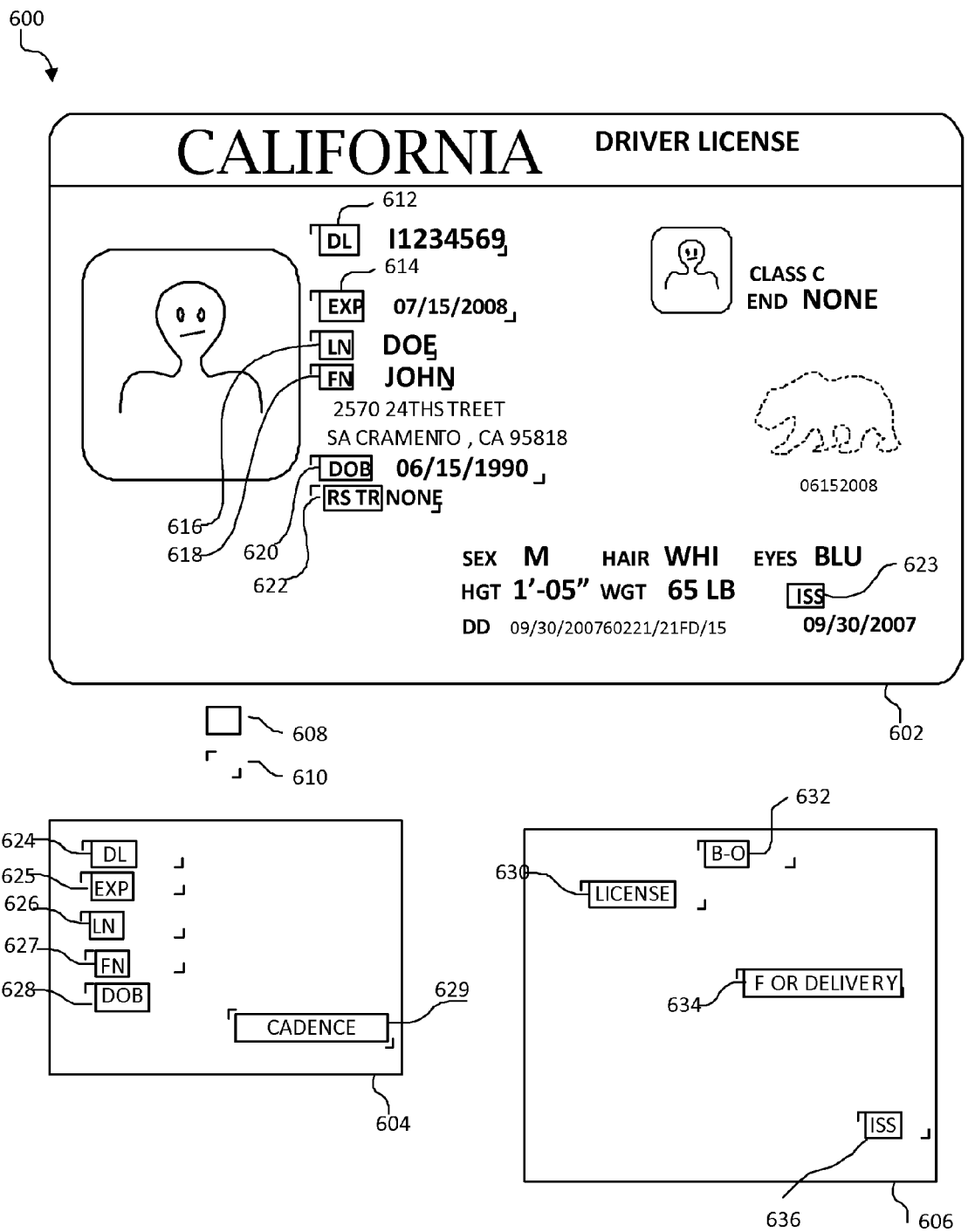
FIG. 6 depicts exemplary illustrations of templates characterized by a parameter $Q_i$, in which aspects of the present invention may be realized.

FIG. 6 demonstrates illustrations 600 of examples of templates for a document with fixed structure. Image 602 is the digital image of the document with fixed structure, which may have undergone distortion correction operations to alleviate geometrical, color or other distortions and enhance readability. Blocks 604 and 606 are candidate templates that may match the rigid structure (document description) of the document 602. In one embodiment, the recognized key words, such as field names 608 (for example, "Last Name" or "Date of Birth") or field values (or data) (such as "Smith" or "Jan. 01, 1966"), are sought in a key words database. The key words 608 in the document 602 may include "DL" (referring to a license number) 612, "EXP" 614 (for an expiration date), "LN" 616 (for a last name), "FN" 618 (for a first name), "DOB" 620 (for a date of birth), "RSTR" 622 (for any restrictions on the holder of the license) and "ISS" 623 (for an issue date).

Template 604 includes key words "DL" 624, "EXP" 625, "LN" 626, "FN" 627, "DOB" 628, "CADENCE" 629. Template 606 is shown with key words "License" 630, "BO" 632 (for applicable business organization such as LLC, INC, etc.), "For Delivery" 634 and "ISS" 636.

The obtained templates 604, 606 may include the aforementioned key words that are found in the image and that may have been used to create this template. These key words may be regular expressions or they may be described in some other way, such as "last name" or "category." In one embodiment, the user describes these key words while filling out the description of the template.

The task of data capture from the incoming document image is solved by what is known as templates matching (208, FIG. 2).

Template Selecting:

In one embodiment, the quality of the matched template is characterized by the parameter $Q_i$. This template parameter may be computed in various ways.

Analyzing the two matched templates against document image 602 at step 208 (FIG. 2), it may be noticed that as a candidate for the applicable template to be used for document 602, template 604 contains five (5) out of seven (7) key words, or approximately $Q_i=71\%$ accuracy. As a candidate for the applicable template to be used for document 602, template 606 has only one out of seven key words, or approximately $Q_i=14\%$ accuracy. Because of inherent difficulties in recognition (for example at step 206, FIG. 2) of individual characters, it is possible that a few key words will not be found even though the words are actually in the electronic image. This may, in one embodiment, explain the lack of 100% accuracy in determining the applicable template to be used on an incoming image of document with fixed structure. In addition to the key words described, one may note the reference points 610 denoted by the angle markings shown, which limit the area of the electronic image where the key words and data will be found. These reference points are introduced for clearness.

An example of captured by using a template 604 data corresponding to the key words of the document 602 includes license number I1234569 (corresponding to key word "DL"), expiration date Jul. 15, 2008 (corresponding to key word "EXP"), last name Doe (corresponding to key word "LN"), first name John (corresponding to key word "FN"), date of birth Jun. 15, 1990 (corresponding to key word "DOB").

Figure 5A:
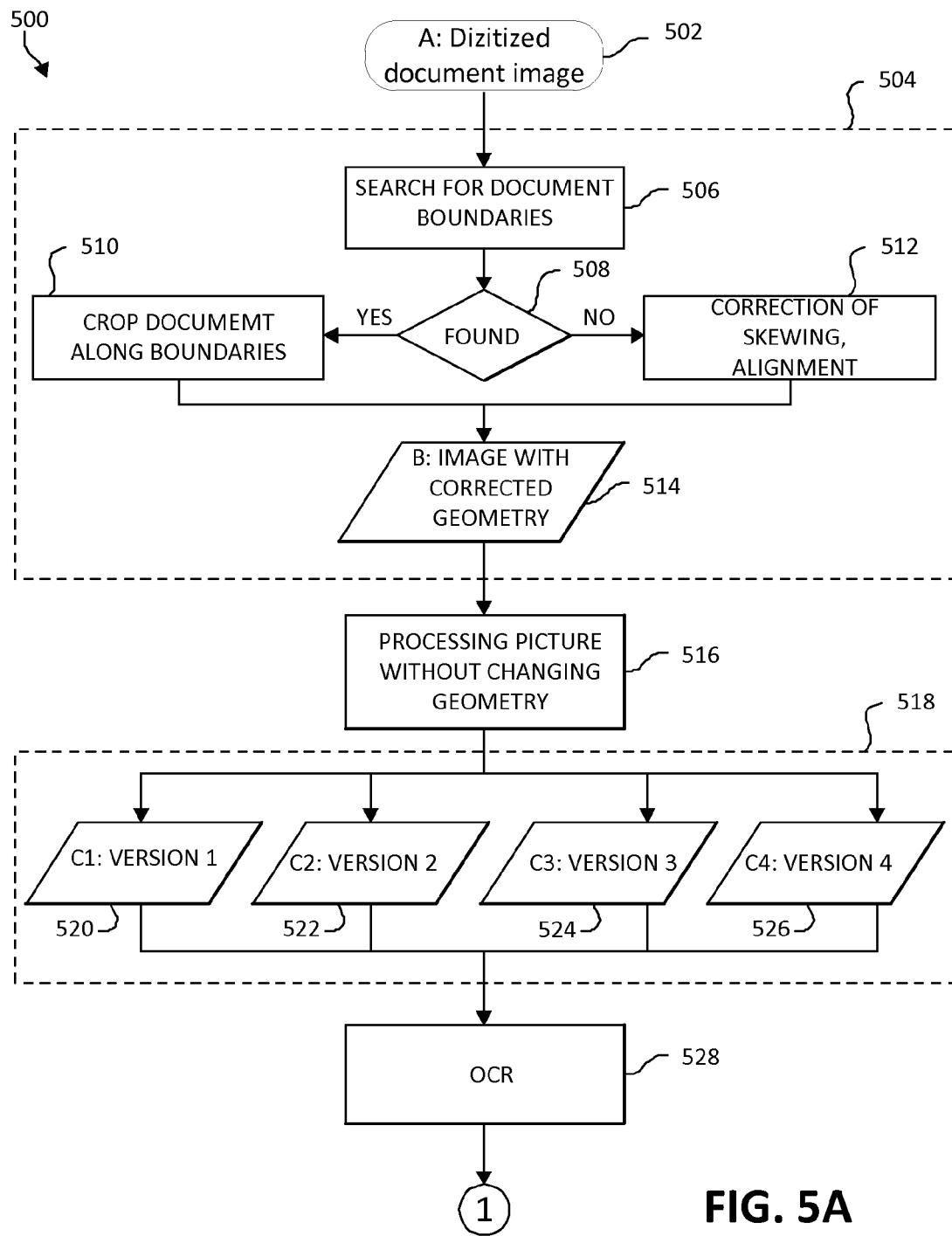
FIG. 5A is a flow chart diagram of a first portion of a detailed exemplary method for extracting data from an image of document with fixed structure, in which aspects of the present invention may be realized.
Figure 5B:
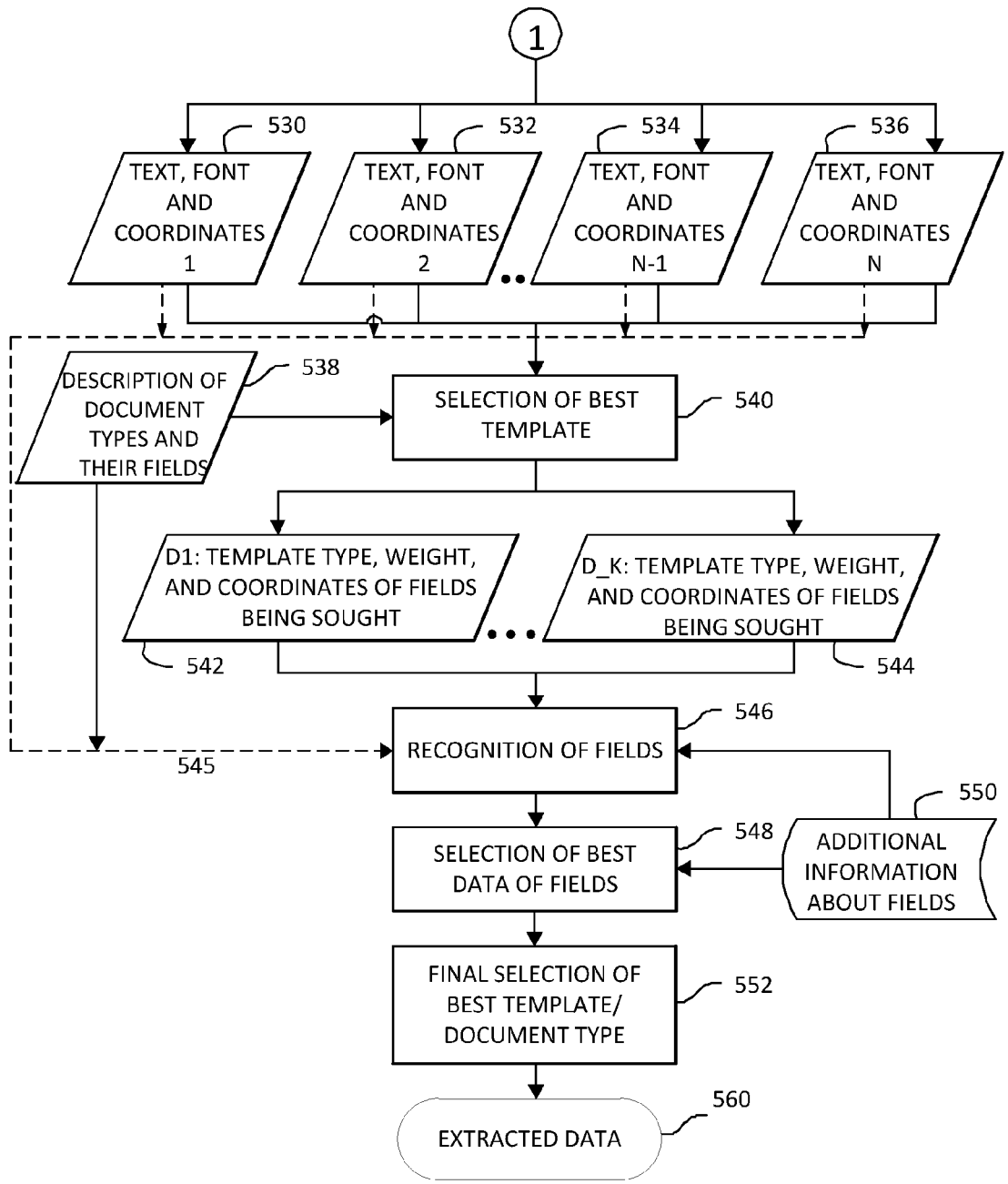
FIG. 5B is a flow chart diagram of a second portion of the detailed exemplary method for extracting data from the image of document with fixed. Continued from FIG. 5A.

Referring now to FIG. 5 an exemplary method 500 for data capture from images of documents with fixed structure is shown in flow chart format in details. As a first step, an electronic representation (e.g., photograph) of the document by photographing, scanning, or otherwise digitizing the document (step 502) is received. A digital (electronic) image of the document is produced. The digital image may have geometric and color distortions that inhibit extraction of data from it. The steps enclosed by dotted line 504 as follows represent the correction of geometric, color, and other distortions. This step may be optional.

Referring to this exemplary combination of steps 504, if the image contains geometric distortions (rotation, perspective, non-linear distortions), they may be corrected before the next step. To correct the geometry, several approaches are used; they may be used separately or sequentially in any order. In one of the embodiments of this method, the geometric distortions can be corrected as described in U.S. patent application Ser. No. 13/561,242 filed on Jul. 30, 2012 entitled "Straightening Out Distorted Perspective on Images." In another embodiment of the method 500, an alternative procedure for correcting distortions as described below may be used.

The boundaries of the document are sought (506). For example, this may be as described in patent application Ser. No. 14/162,694 entitled "AUTOMATIC CAPTURING OF DOCUMENTS HAVING PRELIMINARILY SPECIFIED GEOMETRIC PROPORTIONS". If the boundaries are found as a result (508), the document is transformed to make a document within these boundaries rectangular with the proportions specified (510). For example, all of the boundaries are placed in two standard formats—portrait and landscape pages with fixed proportions. The selection of portrait or landscape may be made based on the width and height of the boundaries found in the initial image. The selection of portrait or landscape for the image may be made either before or after the geometric distortions are corrected.

In other words, method 500 is looking for one of several types of documents based on available information. For example, it may be known that the pages of all of the sought documents are in a 3:4 or a 4:3 ratio. Accordingly, if the boundaries found show that its width is less than its height, the geometry is adjusted to 3:4. If the width is more than the height, the geometry is adjusted to 4:3. In another example, the proportions might be 16:9, 100:333 or some other numbers. In one of the embodiments of the method 500, the image may not be taken to a standard size at all. In this embodiment, the boundaries are found as described above and along the boundaries found, the image is cropped (510) such that a horizontal (not turned to angles other than 90) rectangle is obtained. After the transformation, the image is equalized within the boundaries.

In one of the embodiments of the method 500, the determination step described previously may be done only if the boundaries of the document were not found at 508. In another embodiment, this step is always performed. Embodiments are possible in which performance of this step depends on other conditions. Irregularities in the geometry are corrected in the geometry (512) so that the horizontal lines are horizontal and the vertical lines are vertical. Situations in which the distortion is oriented upside down are also corrected. An example of correcting the slope and uneven lines can be seen in FIGS. 4A and 4B, described previously. As a result of processing the geometry of the image, an image B is obtained at 514 for use in the remaining processing steps. The initial image is not used in further processing.

The steps of cropping a found document with fixed structure along boundaries, and/or correction of skewing, alignment, and other geometric distortions as described by the above examples is represented in steps 508, 510, and 512, as shown in FIG. 5.

After the geometric distortions are corrected (or not corrected as represented by step 516), multiple images $C_1$, $C_2$, ... $C_n$ (518) may be generated, which geometrically match image B but have color information that differs. In particularly, in some cases, the digital image of document may be not sharp or may have noise in areas where there are data or may have other distortions of color. To address these cases, several copies of the image may be created and different filters may be applied to each of the copies. These might be different versions of binarization, and different filters, such as blur, sharpen, brightness, contrast, or other, may be used in the process. Then, for example, when the "binarization" filter is used, one word, say "first name", will be more clearly visible (will be recognized by an OCR engine) and when the "blur" filter is used, the word "last name" will be recognized. Although it may be that "first name" and "last name" are unrecognizable on the initial image.

Figure 11:
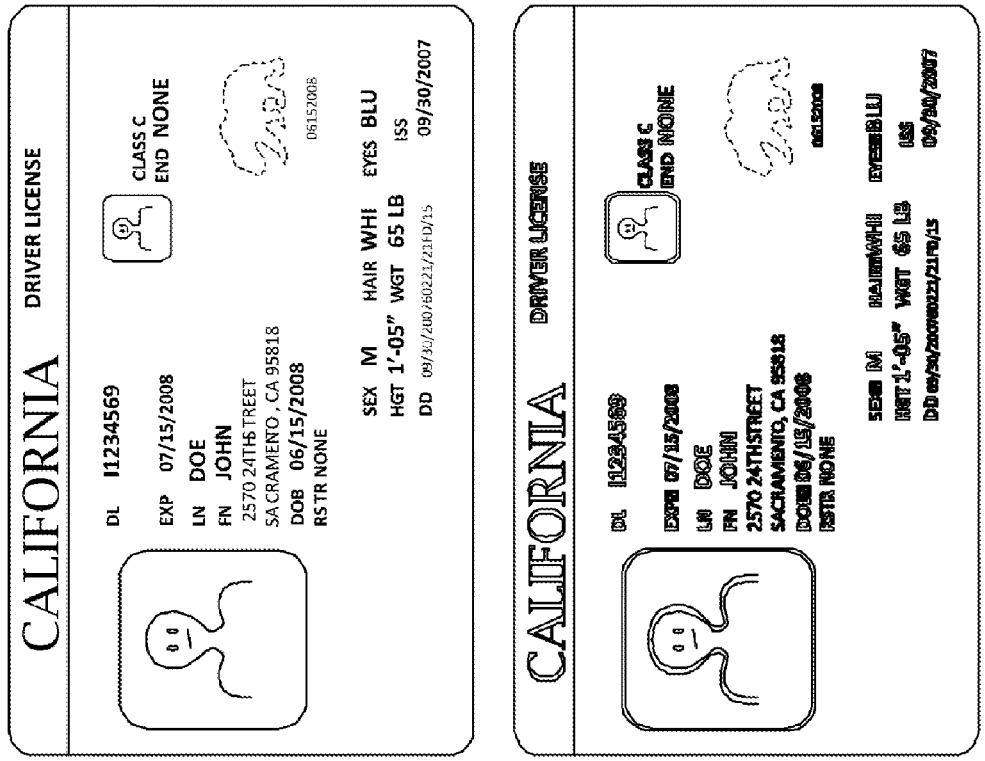
FIG. 11 depicts illustrations of exemplary applications of filters to the image of document with fixed structure in a data extraction process, here again in which aspects of the present invention may be realized.
Figure 11:
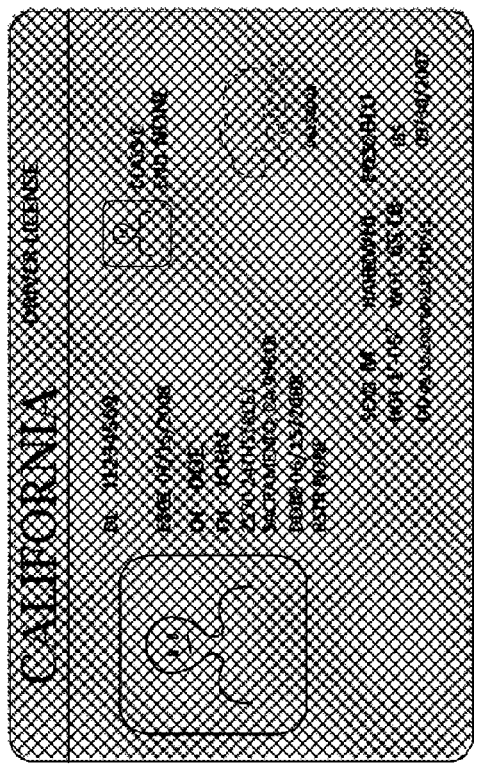
Figure 11:
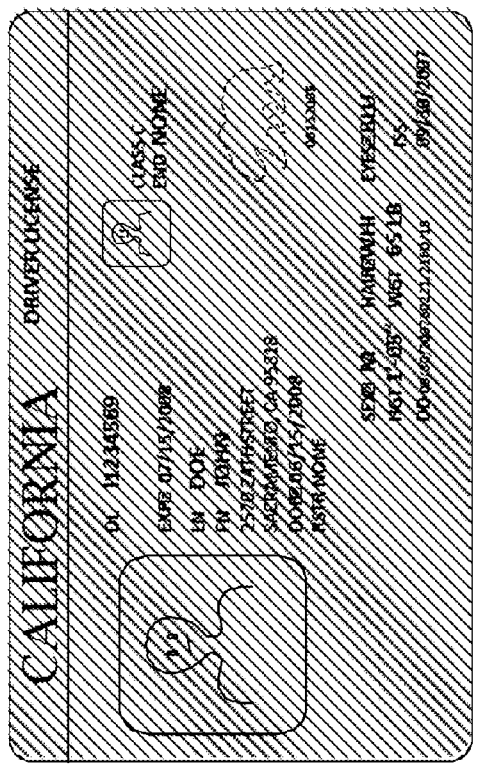

FIG. 11 shows an illustration of applying the filters using method 500 to a digital image. Each of the four digital images shown has differing filters applied, which may lead to some text being more clearly visible in a particular situation. The use of filters in conjunction with the mechanisms of the illustrated embodiments is an optional functionality, as one of ordinary skill in the art will appreciate.

Differing types of pre-processing steps (for example, 504) may be more effective on differing kinds of images, as one of ordinary skill in the art will appreciate. Accordingly, depending on the type of image, method 500 selects the preprocessing that will give the best quality result. If the types of images are not known in advance (cloud-based automatic system, for example), then an attempt may be made to figure out the transformations that is believed will give the best quality.

It is also possible to attempt to automate the selection of preprocessing types. In such an embodiment, an adjusted database of images is obtained of each type; and by using some optimization algorithm, a set of preprocessing actions that will yield the best quality may be then selected.

All of the variations (520, 522, 524, and 526) $C_i$ of the image that are obtained at this step have one common property—the text and other elements of the image in them have the same coordinates. Coordinates are computed from the boundaries of the document. Several variations are generated so as to increase the probability that the text contained in the image will be found and recognized when the variations are read. Initially, all the geometrically identical variations $C_i$ of the image examined (and there may be more than one) are recognized (528) by means of OCR/ICR, and the information about the text, the font used in the document image, the text's coordinates, and the coordinates of the rectangles enclosing different words is obtained (530, 532, 534, 536). In one embodiment the images of documents with fixed structure (520, 522, 524, and 526) are recognized (528) automatically. So several versions of recognition (530, 532, 534, 536), each for the corresponding copies of image document B (520, 522, 524, and 526) are obtained.

The recognized text (530, 532, 534, 536) is broken down into individual words based on information about spaces between them. For each recognized word an information about rectangle that encloses the word is stored in memory. A word could be a date, a figure, a number or something similar. One of ordinary skill in the art will appreciate that reference to the term "word" herein includes, and is intended to refer to, a wide variety of representative information in this way.

At the stage (528), recognition of images $C_1, C_2, \ldots, C_n$ (518) is performed to find the reference objects or anchor (such as points, words, etc) and the areas for each reference object (anchor). As was already described above, in according to the presented invention recognized key words are used as reference objects. For example, at this stage the process of finding the key word "last name" (that will be reference objects) and the corresponding spatial location on the document with fixed structure that follows the key word where the surname might be found. To improve processing Consider the following example, where, for the processed image 900 shown in FIG. 9, a representative portion of XML code is shown, following.

```
<DALayout Version="3" Width="2592" Height="1936">
<Block>
<Word>
    <Rectangle Left="351" Top="317" Right="451" Bottom="425" Letter="C" />
    <Rectangle Left="463" Top="321" Right="567" Bottom="426" Letter="A" />
    <Rectangle Left="583" Top="322" Right="679" Bottom="426" Letter="L" />
    <Rectangle Left="695" Top="322" Right="727" Bottom="426" Letter="I" />
    <Rectangle Left="747" Top="322" Right="835" Bottom="427" Letter="F" />
    <Rectangle Left="839" Top="323" Right="951" Bottom="427" Letter="O" />
    <Rectangle Left="963" Top="327" Right="1055" Bottom="427" Letter="R" />
    <Rectangle Left="1075" Top="327" Right="1179" Bottom="428" Letter="N" />
    <Rectangle Left="1191" Top="332" Right="1231" Bottom="428" Letter="I" />
    <Rectangle Left="1247" Top="332" Right="1343" Bottom="428" Letter="A" />
</Word>
</Block>
<Block>
<Word>
    <Rectangle Left="1497" Top="364" Right="1543" Bottom="419" Letter="D" />
    <Rectangle Left="1551" Top="365" Right="1600" Bottom="420" Letter="R" />
    <Rectangle Left="1605" Top="365" Right="1617" Bottom="420" Letter="I" />
    <Rectangle Left="1621" Top="366" Right="1670" Bottom="420" Letter="V" />
    <Rectangle Left="1676" Top="366" Right="1717" Bottom="421" Letter="E" />
    <Rectangle Left="1726" Top="367" Right="1773" Bottom="422" Letter="R" />
</Word>
<Word>
    <Rectangle Left="1800" Top="370" Right="1840" Bottom="423" Letter="L" />
    <Rectangle Left="1847" Top="369" Right="1859" Bottom="423" Letter="I" />
    <Rectangle Left="1865" Top="366" Right="1913" Bottom="428" Letter="C" />
    <Rectangle Left="1924" Top="369" Right="1961" Bottom="425" Letter="E" />
    <Rectangle Left="1976" Top="370" Right="2015" Bottom="426" Letter="N" />
    <Rectangle Left="2024" Top="371" Right="2062" Bottom="427" Letter="S" />
    <Rectangle Left="2073" Top="371" Right="2115" Bottom="427" Letter="E" />
</Word>
</Block>
<Block>
<Word>
    <Rectangle Left="988" Top="552" Right="1024" Bottom="594" Letter="D" />
    <Rectangle Left="1031" Top="554" Right="1060" Bottom="595" Letter="L" />
</Word>
<Word>
    <Rectangle Left="1104" Top="520" Right="1156" Bottom="599" Letter="I" />
    <Rectangle Left="1167" Top="526" Right="1200" Bottom="601" Letter="1" />
    <Rectangle Left="1215" Top="523" Right="1266" Bottom="602" Letter="2" />
    <Rectangle Left="1275" Top="524" Right="1322" Bottom="600" Letter="3" />
    <Rectangle Left="1337" Top="526" Right="1374" Bottom="601" Letter="4" />
    <Rectangle Left="1389" Top="525" Right="1444" Bottom="616" Letter="5" />
    <Rectangle Left="1449" Top="525" Right="1506" Bottom="603" Letter="6" />
    <Rectangle Left="1505" Top="528" Right="1559" Bottom="609" Letter="9" />
</Word>
</Block>
``` of this type of document, the user may verify the recognized text: for example, the user may correct the errors in recognition and the geometry for recognizing characters and words, or add text that was not recognized. For example, user may also process the recognized text (530, 532, 534, 536) in following way: one might change individual words that are characteristic of this copy of the document to more general descriptions (regular expressions) that are characteristic of this type of document. For example, if the copy of the document included the date "2013 Mar. 26", the user may change the recognized key word to "\d\d\d\d-\d\d-\d\d". Or the user may change the key word to some preliminary determined type, such as assigning a specific format to some word, for example, a date, name, number, or other value.

This type of preprocessing of the recognized characters may also be done automatically. The format for some fields may be known to the system (determined in advance). As a result, the data may be automatically changed to a more general expression "yyyy-mm-dd". Surnames and first names may be processed in similar way.

As one of ordinary skill in the art will appreciate, the complete XML code includes the letters and representative location information for all the key words and associated information found in the document with fixed structure, including "EXP" and the associated date read from the document, "LN" and the associated last name read from the document, and so on. For example, as shown above in the representative portion of XML code, the area of the image that contains the last name ("LN") is described. The processing settings are input; the fact that the area contains the surname, and the dictionary or database is used to check the accuracy of the data extracted after recognition.

In an additional example, a field may be described in the code that contains the date, and a range of dates permitted for this field is shown (in this example, the year of issue of an identification may be no less than 1930 or greater than the current year).

Figure 9:
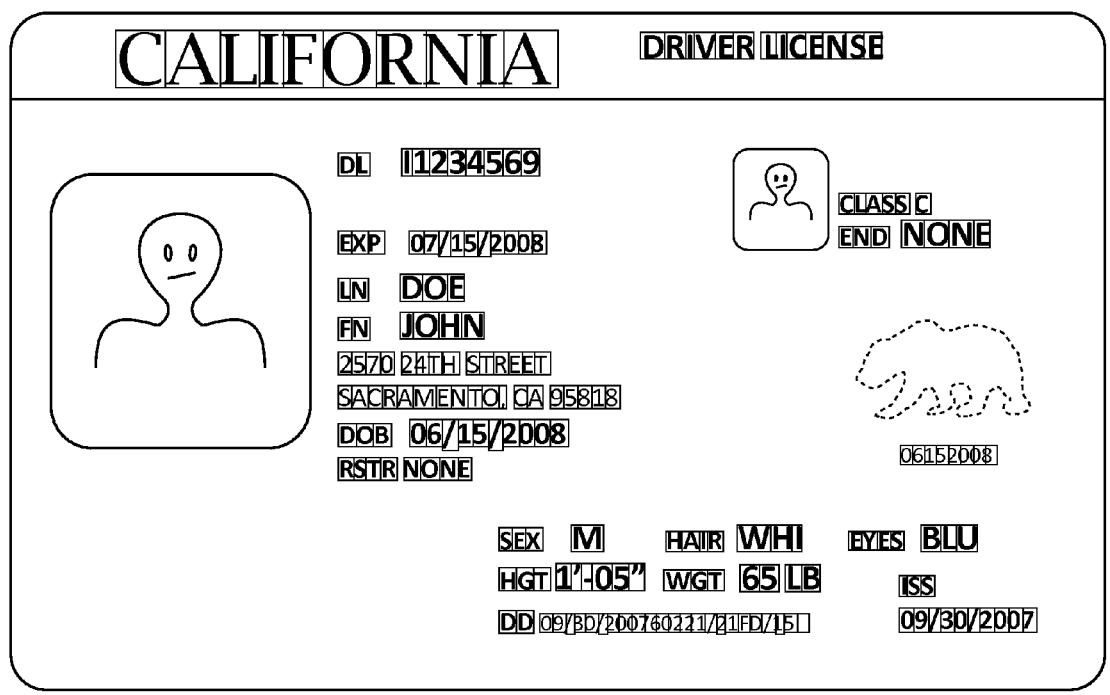
FIG. 9 is an illustration of a processed image of a document with fixed structure, in which aspects of the present invention may be realized.

After the user processes the initial data from image 900 in FIG. 9, a template is produced where data that change from document to document have their associated data changed to regular expressions (highlighted in bold) as follows in the exemplary representative XML code shown:

```xml
<DALayout Version="3" Width="2592" Height="1936">
<Block>
<Word>
    <Rectangle Left="351" Top="317" Right="451" Bottom="425" Letter="C" />
    <Rectangle Left="463" Top="321" Right="567" Bottom="426" Letter="A" />
    <Rectangle Left="583" Top="322" Right="679" Bottom="426" Letter="L" />
    <Rectangle Left="695" Top="322" Right="727" Bottom="426" Letter="I" />
    <Rectangle Left="747" Top="322" Right="835" Bottom="427" Letter="F" />
    <Rectangle Left="839" Top="323" Right="951" Bottom="427" Letter="O" />
    <Rectangle Left="963" Top="327" Right="1055" Bottom="427" Letter="R" />
    <Rectangle Left="1075" Top="327" Right="1179" Bottom="428" Letter="N" />
    <Rectangle Left="1191" Top="332" Right="1231" Bottom="428" Letter="I" />
    <Rectangle Left="1247" Top="332" Right="1343" Bottom="428" Letter="A" />
    </Word>
    </Block>
<Block>
<Word>
    <Rectangle Left="1497" Top="364" Right="1543" Bottom="419" Letter="D" />
    <Rectangle Left="1551" Top="365" Right="1600" Bottom="420" Letter="R" />
    <Rectangle Left="1605" Top="365" Right="1617" Bottom="420" Letter="I" />
    <Rectangle Left="1621" Top="366" Right="1670" Bottom="420" Letter="V" />
    <Rectangle Left="1676" Top="366" Right="1717" Bottom="421" Letter="E" />
    <Rectangle Left="1726" Top="367" Right="1773" Bottom="422" Letter="R" />
    </Word>
<Word>
    <Rectangle Left="1800" Top="370" Right="1840" Bottom="423" Letter="L" />
    <Rectangle Left="1847" Top="369" Right="1859" Bottom="423" Letter="I" />
    <Rectangle Left="1865" Top="366" Right="1913" Bottom="428" Letter="C" />
    <Rectangle Left="1924" Top="369" Right="1961" Bottom="425" Letter="E" />
    <Rectangle Left="1976" Top="370" Right="2015" Bottom="426" Letter="N" />
    <Rectangle Left="2024" Top="371" Right="2062" Bottom="427" Letter="S" />
    <Rectangle Left="2073" Top="371" Right="2115" Bottom="427" Letter="E" />
    </Word>
    </Block>
<Block>
<Word>
    <Rectangle Left="988" Top="552" Right="1024" Bottom="594" Letter="D" />
    <Rectangle Left="1031" Top="554" Right="1060" Bottom="595" Letter="L" />
    <Rectangle Left="1031" Top="554" Right="1060" Bottom="595" Letter="" />
    <Rectangle Left="1104" Top="520" Right="1156" Bottom="599" Letter="[A-Z]" />
    <Rectangle Left="1167" Top="526" Right="1200" Bottom="601" Letter="\d" />
    <Rectangle Left="1215" Top="523" Right="1266" Bottom="602" Letter="\d" />
    <Rectangle Left="1275" Top="524" Right="1322" Bottom="600" Letter="\d" />
    <Rectangle Left="1337" Top="526" Right="1374" Bottom="601" Letter="\d" />
    <Rectangle Left="1389" Top="525" Right="1444" Bottom="616" Letter="\d" />
    <Rectangle Left="1449" Top="525" Right="1506" Bottom="603" Letter="\d" />
    <Rectangle Left="1505" Top="528" Right="1559" Bottom="609" Letter="\d" />
    </Word>
    </Block>
```

This process continues throughout the code as each value is changed in a similar manner, here again as one of ordinary skill in the art will appreciate. Thus, the group of types of documents that the system can process is determined by the set of templates, each of which describes one type of document.

In a subsequent step (540), a template (or several templates) may be matched against the document image. It is possible to use either a single template with the maximum recognition quality $Q_i$, or several templates. For example, if the recognition quality for the templates obtained (at step 206 FIG. 2, 560 FIG. 5, or those templates that were stored in the system) was 86%, 17% and 75%, it would be logical to look at the first and the third templates at this step.

It is beneficial that the user be given a template showing which fields have to be extracted from the document. For example, it is not necessary to extract the word "category" from a driver's license, but it is necessary to extract the letter "B". To extract this letter, the user may describe a rectangular area on the image from which the data need to be extracted, and provide settings for processing this area along with the data that need to be extracted. All this data can be stored in any form suitable for use with an OCR engine, such as in XML format.

Templates Matching:

The information obtained after recognition by means of OCR/ICR (530, 532, 534, and 536, FIG. 5) is used to matching of templates that correspond to various types of documents (538, FIG. 5) and to select the best quality $Q_i$, (540, FIG. 5). In one embodiment, the quality of the matched template is characterized by the parameter $Q_i$. This template parameter $Q_i$ may be computed in various ways. For example the Quality $Q_i$ of the matched template may be computed based on the coincidence of the recognized key words in the document image and corresponding words in the template. Here term "words in the template" may refer to the character, figure, word, regular expression, etc. As a result, it is possible to match template either individually based on the results of recognition of each image $C_i$, or based on the consolidated results of recognizing all the images or groups of images.

Returning to method 500 in FIG. 5, for each word in the text of the template, method of matching a template 500 searches for the same word in the recognized text of the incoming image of document with fixed structure. The search may tolerate a certain number of errors. Edit distance may be a measure of the number of errors. Edit distance may be computed, for example, as a Levenshtein distance. For example, edit distance may be ⅓ of the length of a word being sought. In this case, for the reference object, namely for reference object or key word "some" in the template, the word "come" may be found in the recognized text of the incoming image of document with fixed structure. One may also set an absolute limit on the number of errors when searching, e.g., no more than 2 errors regardless of the length of the word.

A single word on the image may correspond to more than one word in the template, for example, a specific date or a general data format, such as 20 Mar. 2013 and \d\d-\d\d-20\d\d (a specific number plus the general number format). A set of words is thereby obtained that describes the text in this type of document.

If the reference object (key word) is a regular expression, a search for the portion of the recognized text that corresponds to this regular expression is conducted. When this occurs, a search can be conducted taking into account possible discrepancies between the recognized text and the standard regular expression. Such a search may be conducted, for example, after putting a limitation on the maximum edit distance from a regular expression.

For example, a driver's license number may the format: K-000-00-00. The license number may be described with a regular expression K-\d\d\d-\d\d-\d\d, \d=$ in a corresponding data space (see, e.g., FIG. 6). The result of recognition in the image of document may be: K-U00-98-0I. If one does a search with no errors tolerated, nothing is found. However, if one allows discrepancies between the text and the template of document with fixed structure during the search, the text is found with accuracy up to two changes.

More than one corresponding word may be found in the recognized text of the image of document with fixed structure to be processed to each reference object (for example key word) in template. For each corresponding word found, the characteristics are noted—the coordinates of the beginning of the corresponding words in the recognized text, the coordinates of the end of the corresponding words, the size of the font, and the coordinates of the individual letters. All the coordinates are computed from the boundaries of the document.

For each correspondence of a word in the template and in the results from recognition of processed image of document with fixed structure, method 500 finds the coefficients $x_i$, $y_i$, $x_i'$, $y_i'$.

Examples of such coefficients follow:
1. x—coordinate of the left edge of the reference word, x'—coordinate of the left edge of the word in recognized text.
2. x—coordinate of the right edge of the reference word, x'—coordinate of the right edge the word in recognized text.
3. x—coordinate of the left edge of the second letter of the reference word, x'—coordinate of the left edge of the second letter of the word in the recognized text.
4. y—coordinate of the upper edge of the reference word, y'—coordinate of the upper edge of the word in recognized text.
5. y—coordinate of the lower edge of the reference word, y'—coordinate of the lower edge of the word in the recognized text.

As a result, a system of linear equations is obtained without an exact solution. For this template, the solution ($k_x$, $k_y$, $b_x$, $b_y$) is sought that has the least error using some measure. For example, a solution using the Gauss-Seidel method may be sought, or for another example, a solution using the Lebesgue measure may be sought. This error or some monotone function of the error provides a quality metric Q for the matching of the template against the image being examined. If several templates are identified, a quality metric Q and coefficients ($k_x$, $k_y$, $b_x$, $b_y$) is found for each of the available templates.

In one embodiment when matching template against the document image, method 500 attempts to find the optimal transformation of the parallel shift and compression/expansion that transforms the master image (template was created based on master image) into the image of document being processed. In such transformations, the corresponding fields must be moved one to another. To do so, one solves a system of equations of the type:

$$x_i' = k_x * x_i + b_x$$

$$y_i' = k_y * y_i + b_y$$

Solving these equations may be performed, for example, by Gauss-Jordan Elimination or by any other method. The result of solving the system is coefficient values $k_x$, $k_y$, $b_x$, $b_y$ that minimize error under some specified metric, such as least squares. In another embodiment of the method 1100, another metric may be used. The transformation does not include rotation because rotation on the image examined is corrected earlier prior to recognizing the text in the image.

The same text in differently colored pictures, for example, may be recognized differently. An optimal template may be selected for each document image, taking into account only the recognized text in that image. But one can join the recognized text in all the images and select the best template for the compilation.

The result of this step is a list: template quality $Q_i$, and the coefficients $k_x$, $k_y$, $b_x$, $b_y$ (which describe the transformation of the image used to create the template to the current image of document such that the fields are matched on each other). The quality $Q_i$ may be computed, for example, as a number of matching reference objects. For example, if the key words are "last name," "date of issue," "category," and "number," and 3 words out of 4 were found, the recognition quality is 75%; if 1 was found, it is 25%. After templates are matched based on the quality value for the matching, one or more templates with the highest quality $Q_i$ are selected. For example, if the recognition quality of the templates obtained is 86%, 17% and 75%, it would be logical to examine the first and the third templates at this stage of the method 500.

Figure 7:
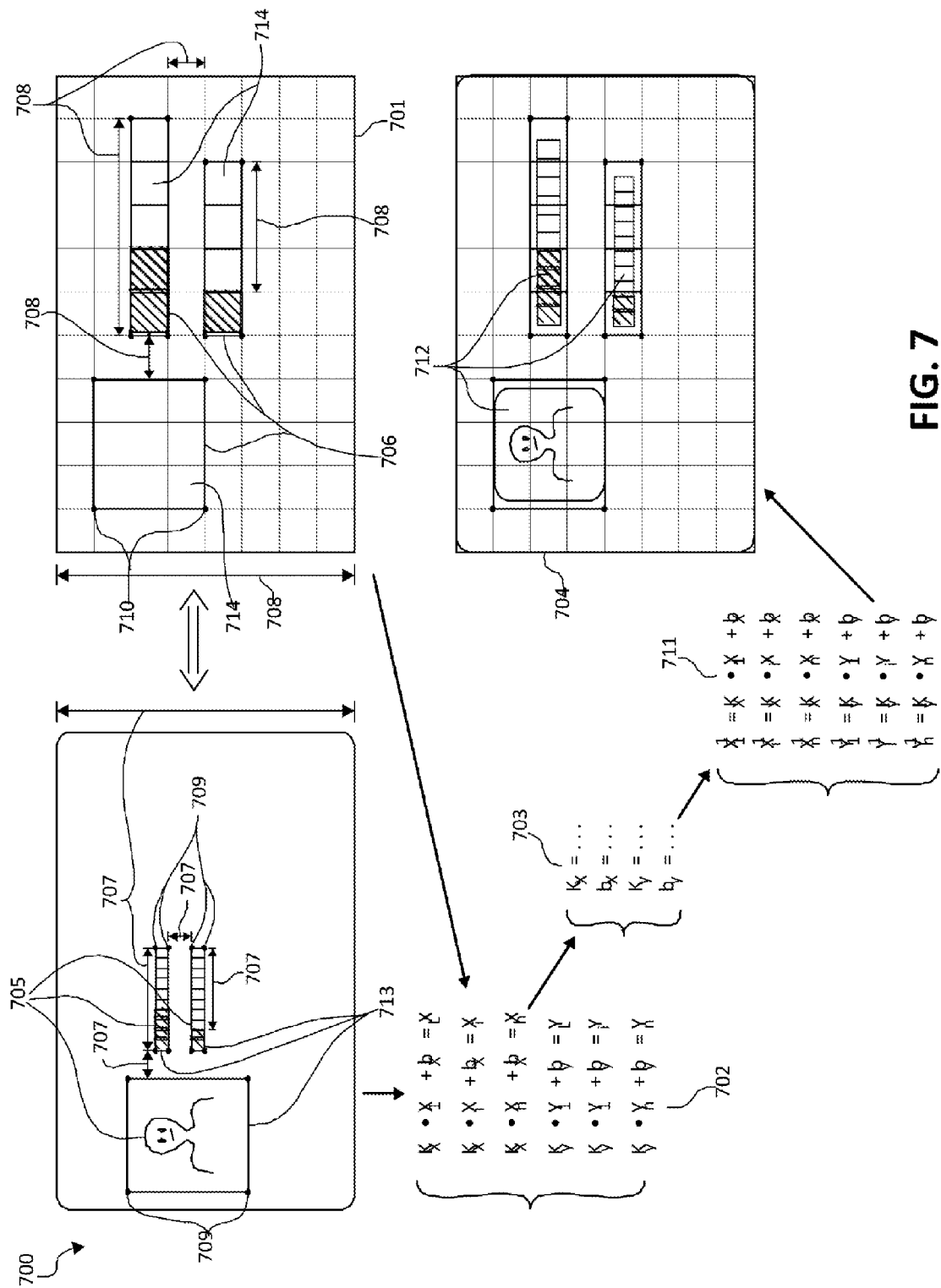
FIG. 7 depicts exemplary illustrations of matching a template against an image of a document with fixed structure, in which aspects of the present invention may be realized.

An exemplary process of templates matching is shown in FIG. 7, following. Matching a template against the image of document with fixed structure may be thought of as equivalent to finding a transformation that will take area 705 of document 700 bound by the reference points to the area 706 of template 701 that corresponds to it. To do that, it is necessary to solve a system of equations (702) in which the reference points 709 can be transformed into corresponding reference points 710, with minimum error. The coordinates of the reference points 709 are $x_i$, and those of the reference points 710 are $x_{i\_template}$. Coordinates are always computed from the boundaries of the document. It is important to note that the areas where there are data (713) completely fall into the areas of the template that correspond to them (714). To do that, the distances 707 must be transformed into distances 708.

The result of the solution of the system is coefficients 703 for transformation of document image 700. Coefficient $k_x$ is the contraction coefficient along the x axis, $k_y$ is the contraction coefficient along the y axis, $b_x$ is the document displacement coefficient along the x axis, and $b_y$ is the document displacement coefficient along the y axis. Afterwards, the coordinates for the reference points 709 that are obtained after transformation 703 are computed and new coordinates 711 are obtained. The coordinates 711 may not be the same as the coordinates of the reference points 710 because if there are more than two reference points 709, the system (702) does not have an exact error-free solution. After transformation 703, a document is obtained that is placed on template 704.

It is preferable to have already extracted fields data 712 with a minimum number of errors. This stage of recognition can also be done in the cloud or on a stationary device (PC, server, etc.).

Based on the results of the previous stage (540), hypotheses about document types (542, 544, FIG. 5) are proposed. Hypotheses comprise information about template type, coordination of fields being sought, etc. Among these recommended templates, there is a template that corresponds to the actual type for the document being examined. However, some types of documents may be rather similar to each other, so method 500 may not be limited simply to the selection of the best template; several available templates may be examined, for example. One type of template is finally selected after the fields are recognized.

Each of the matched templates will determine the list of coordinates and processing settings for the fields in the examined image from which data have to be extracted. Suppose, for example, it is desired to obtain data from a specific field. The result of matching the template is the coordinates of this field on images $C_1, \ldots, C_n$. Because all the images $C_i$ have the same locations of elements (same geometry), the text data for the field can be extracted from any of the images.

Figure 10:
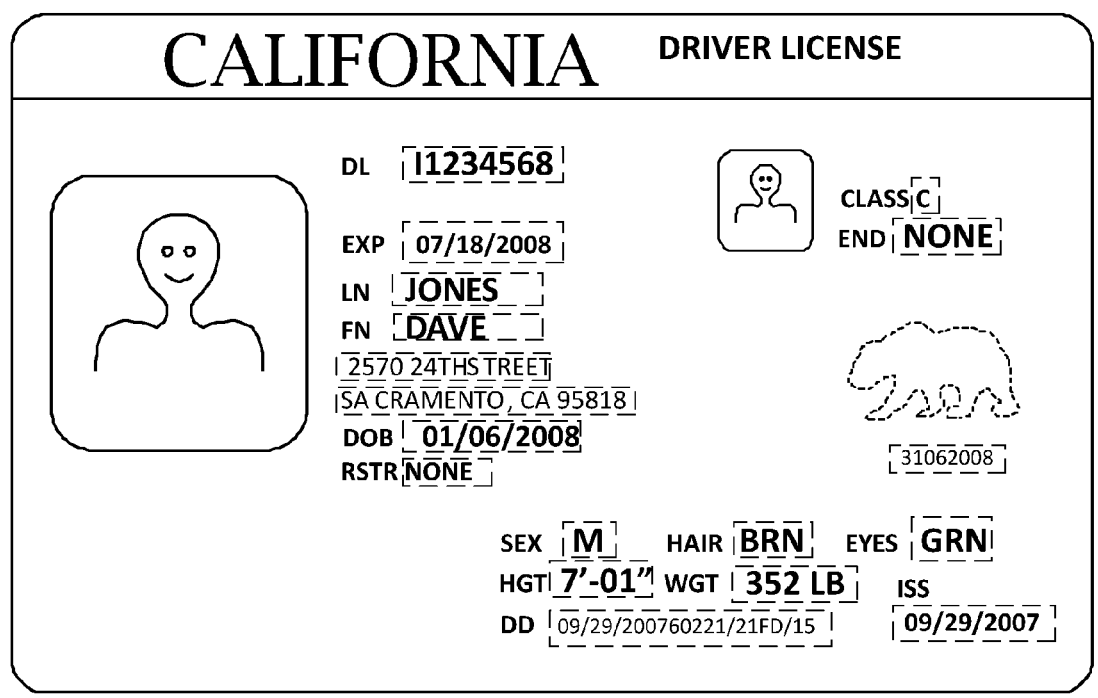
FIG. 10 is an illustration of exemplary marked locations of field elements represented in the detailed description, following, in eXtensible Markup Language (XML)

FIG. 10 shows the location of fields that contain data to be extracted. For the image of the document with fixed structure 1000 in FIG. 10, the recognized data may be represented by the following portion of exemplary XML code. Here again, one of ordinary skill in the art will appreciate that the entire XML segment will be representative of the entirety of recognized data:

```xml
<?xml version="1.0" encoding="UTF-8" standalone="yes" ?>
<document xmlns="http://www.abbyy.com/FineReader_xml/FineReader10-schema-v1.xml"
    xmlns:xsi="http://www.w3.org/2001/XMLSchema-instance"
    xsi:schemaLocation="http://www.abbyy.com/FineReader_xml/FineReader10-schema-
    v1.xml  http://www.abbyy.com/FineReader_xml/FineReader10-schema-v1.xml"
    version="1.0" producer="ABBYY FineReader Engine 11" languages="">

<block blockType="Text" l="107" t="40" r="920" b="100">
    <region>
        <rect l="107" t="40" r="920" b="100" />
    </region>
    <text>
    <par align="Justified">
    <line baseline="85" l="111" t="44" r="916" b="94">
    <formatting lang="EnglishUnitedStates">
        <charParams l="111" t="44" r="157" b="94">C</charParams>
        <charParams l="162" t="46" r="213" b="94">A</charParams>
        <charParams l="216" t="45" r="260" b="94">L</charParams>
        <charParams l="264" t="45" r="284" b="94">I</charParams>
        <charParams l="289" t="45" r="330" b="94">F</charParams>
        <charParams l="333" t="44" r="383" b="94">O</charParams>
        <charParams l="386" t="45" r="435" b="94">R</charParams>
        <charParams l="436" t="45" r="488" b="94">N</charParams>
        <charParams l="491" t="45" r="511" b="94">I</charParams>
        <charParams l="515" t="46" r="566" b="94">A</charParams>
        <charParams l="557" t="60" r="568" b="72">"</charParams>
        <charParams l="569" t="72" r="575" b="82" suspicious="1">-</charParams>
        <charParams l="570" t="60" r="590" b="71" suspicious="1">-</charParams>
        <charParams l="591" t="44" r="767" b="71" />
        <charParams l="768" t="44" r="775" b="69" suspicious="1">■</charParams>
        <charParams l="775" t="65" r="786" b="70" suspicious="1">-</charParams>
        <charParams l="789" t="44" r="795" b="69" suspicious="1">■</charParams>
        <charParams l="798" t="44" r="810" b="69" suspicious="1"><</charParams>
        <charParams l="810" t="44" r="820" b="69" suspicious="1">^</charParams>
        <charParams l="823" t="44" r="844" b="70" suspicious="1">e</charParams>
        <charParams l="847" t="44" r="869" b="69" suspicious="1">n</charParams>
        <charParams l="870" t="44" r="892" b="70" suspicious="1">s</charParams>
        <charParams l="895" t="44" r="916" b="71" suspicious="1">e</charParams>
    </formatting>
    </line>
    </par>
    </text>
    </block>
    <block blockType="Text" l="544" t="111" r="560" b="133">
    <region>
        <rect l="544" t="111" r="560" b="133" />
    </region>
    <text>
        <par lineSpacing="-1" />
    </text>
    </block>
```

-continued

```
<block blockType="Text" l="392" t="132" r="646" b="176">
<region>
    <rect l="392" t="132" r="646" b="176" />
        </region>
<text>
<par align="Justified">
<line baseline="175" l="393" t="133" r="637" b="175">
<formatting lang="EnglishUnitedStates">
    <charParams l="393" t="152" r="409" b="172" suspicious="1">D</charParams>
    <charParams l="412" t="152" r="426" b="172" suspicious="1">L</charParams>
    <charParams l="442" t="137" r="449" b="171" suspicious="1">1</charParams>
    <charParams l="455" t="137" r="471" b="171" suspicious="1">1</charParams>
    <charParams l="480" t="137" r="503" b="171" suspicious="1">2</charParams>
    <charParams l="508" t="137" r="530" b="172">3</charParams>
    <charParams l="533" t="136" r="557" b="171">4</charParams>
    <charParams l="560" t="133" r="584" b="172">5</charParams>
    <charParams l="584" t="137" r="611" b="175" suspicious="1">6</charParams>
    <charParams l="612" t="137" r="637" b="175" suspicious="1">8</charParams>
</formatting>
</line>
</par>
</text>
</block>
```

Returning briefly to document 1000 in FIG. 10, the location of the elements in an exemplary portion of XML is described as follows:

```
<?xml version="1.0" encoding="utf-8" ?>
<driverLicenseUsa.template template="ca_template_ready">
<firstName>
    <left>435</left>
    <top>306</top>
    <right>676</right>
    <bottom>332</bottom>
        </firstName>
<lastName>
    <left>436</left>
    <top>269</top>
    <right>676</right>
    <bottom>296</bottom>
        </lastName>
<address1>
    <left>390</left>
    <top>343</top>
    <right>721</right>
    <bottom>364</bottom>
        </address1>
<address2>
    <left>390</left>
    <top>370</top>
    <right>767</right>
    <bottom>391</bottom>
        </address2>
<birthDate>
    <left>455</left>
    <top>406</top>
    <right>676</right>
    <bottom>436</bottom>
        </birthDate>
<expiryDate>
    <left>448</left>
    <top>220</top>
    <right>676</right>
    <bottom>254</bottom>
        </expiryDate>
        </driverLicenseUsa.template>
```

Method 500 recognizes the field on one or more images $C_i$ (546, FIG. 5). Recognition of fields may be performed immediately after results of recognition (530, 532, 534, 536) are obtained (545). Then, the best data for the fields is selected from among the variations of recognition (548, FIG. 5). The best data for the field may be selected using various criteria. For example, the best data for the field may be based on an internal rating for recognition quality, as output by the OCR engine. Alternatively, the best data for the field may be determined by using a database for first names, surnames, names of states, and other data. In another alternative embodiment of the method 500, one can also select a field that best corresponds to a previously determined format. After this step, a list of fields and data that corresponds to the fields and data for each template in the group is obtained.

After recognizing the fields in the image of the document with fixed structure based on using all the templates, the best template (552, FIG. 5) is finally chosen based on rating the recognition quality for the fields and the quality $Q_i$, which has been computed previously and was used to narrow the list of templates. The selected best template may determine the type of the document. This step may be performed even before selection of the best template, or at the time the field is recognized. The recognized fields may then undergo optional post-processing as previously described.

There may be additional information (550, FIG. 5) known about the fields (or key words). For example, if one knows that the result of recognizing a field must be a date, the result of recognition is modified such that the result is in fact a date. In an example, the letter O is replaced by a zero, and other characters frequently mistaken during recognition are replaced so that the result matches the field described. Words may also be regular expressions or described in some other way, such as "last name," or "category;" or, for example, these fields have their own dictionaries. In one embodiment, the user describes them when creating the template or indicates that the fields are in an associated dictionary database or that the fields were found in another location.

The results of the post-processing stage (or the stage of selecting the template if the post-processing was performed earlier) are the results of the operation of described method 500. To summarize, at the input stage, an image of document with fixed structure was obtained and at the output stage, one template from a set of templates was selected and matched, determining the type of document and the data in the fields (560, FIG. 5) that correspond to that type. For document 1000 in FIG. 10, the result of various operations of method 500 yields the following exemplary XML code:

```xml
<?xml version="1.0" encoding="utf-8" ?>
<driverLicenseUsa>
    <firstName>DAVE</firstName>
    <lastName>JONES</lastName>
    <birthDate>01/06/2008</birthDate>
    <address1>2570 24TH STREET</address1>
    <address2>SACRAMENTO, CA 95818</address2>
    <number />
    <expiryDate>09/29/2007</expiryDate>
</driverLicenseUsa>
```

Figure 8:
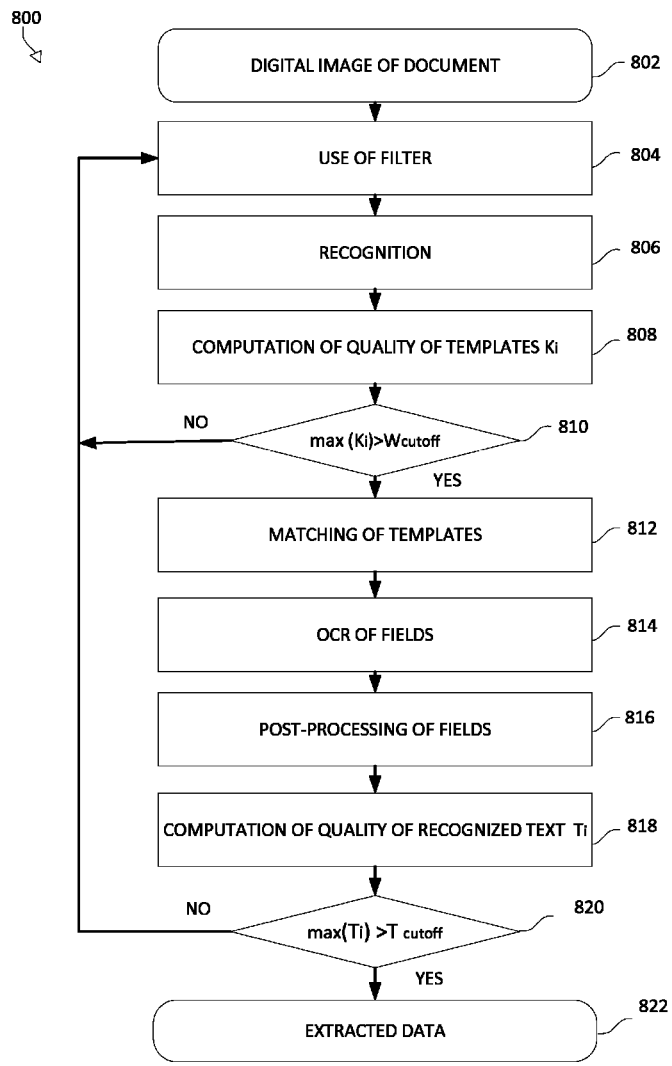
FIG. 8 is a flow chart diagram illustrating an additional exemplary method for extracting data from an image of a document with fixed structure, again in which aspects of the present invention may be realized.

In an additional embodiment, the mechanisms previously described may be performed in a simplified, accelerated version as illustrated in FIG. 8, following. FIG. 8 depicts an additional exemplary method 800 for data capture from images of documents with fixed structure according to the mechanisms of the present invention.

After taking the digital image of the document (802), only one filter is applied (804) to the image to perform distortion correction. Subsequently, the image formed after the filter is used is recognized (806). The quality $K_i$ of the matching template is computed (808), for example, the same way the quality of the template matching $Q_i$ was computed and is shown in FIG. 6, previously. Here the template may be taken from memory storage of the system. At 810, all the templates for which the quality of coverage of template $K_i$ is less than some threshold value of quality of coverage of the template $W_{cutoff}$ are discarded. If there are no templates with quality of coverage higher than the threshold value, the method 800 returns to the step where the filter is used and the next filter is applied.

Those templates for which the matching quality is higher than the threshold value now have to be matched (812) by transforming the coordinates. After this, the fields (814) where the data are located are read. These fields then are subjected to post-processing (816). In particular, all the words are turned into a form in which they either appear in a dictionary of this field (referred to herein as "well-known") or they are entered using a regular expression that describes this field. Method 800 then computes the quality of the recognized text $T_i$ (818) (one can also compute the quality of the template matching, $K_i$)—i.e., how many words are well-known. At step 820, the method 800 removes those templates for which the recognition quality is less than value $T_{cutoff}$; if there are no more templates left, the method 800 returns to the filter-using step and apply the next filter. However, if the maximum of the recognition qualities $T_i$ is more than $T_{final\ cutoff}$, then the data that is extracted is exported. The data obtained may be used in different situations and circumstances. Method 800 may be used, for example, by an insurance underwriting functionality. In an exemplary scenario, a vehicle may be located in a remote location from a stationary device for which auto insurance is proposed. The insurance agent may take a camera, smart phone, tablet, or other portable device with an application installed. The results of processing the extracted data may be displayed on a Graphical User Interface (GUI) to the insurance agent, which may include, for example, depicting which insurance programs are suitable for the particular applicant and vehicle in question.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method comprising:
    acquiring an electronic image of a document with a fixed structure, wherein the fixed structure comprises field names and field values corresponding to the field names, and wherein the field names and the field values are located at set locations in the document;
    recognizing key words in the electronic image of the document, wherein the key words comprise the field names and the field values;
    matching one or more templates from a plurality of templates with the document, wherein the one or more templates comprise reference objects that specify areas in the electronic image of the document where permitted field values corresponding to field names are to be extracted, and wherein matching the one or more templates comprises matching the field names and the permitted field values from the one or more templates with the identified field names and the field values from the recognized key words;
    selecting, by a processor device, a template from the one or more templates based on a quality of a match between the field names and the permitted field values from the template with the identified field names and the field values from the recognized key words; and
    extracting the field values from the electronic image of the document using the selected template.

2. The method of claim 1, further comprising performing distortion correction of the electronic image of the document.

3. The method of claim 2, wherein performing the distortion correction comprises performing at least one of alignment of lines in the electronic image of the document, correction of skewing in the electronic image of the document, correction of geometry in the electronic image of the document, color correction in the electronic image of the document, restoration of blurred and unfocused areas in the electronic image of the document, and removal of noise from the electronic image of the document.

4. The method of claim 2, wherein performing the distortion correction comprises identifying boundaries within the electronic image of the document.

5. The method of claim 4, further comprising cropping the electronic image along the identified boundaries.

6. The method of claim 1, further comprising applying at least one filter to the electronic image of the document.

7. The method of claim 1, further comprising determining a type of the document based on the selected template.

8. The method of claim 1, wherein the reference objects comprise regular expressions.

9. The method of claim 1, wherein recognizing the key words in the electronic image of the document is based on additional information about the recognized key words.

10. The method of claim 1, further comprising:
    computing qualities of matches between the field names and the permitted field values from the one or more templates and the identified field names and the field values from the recognized key words;
    identifying the one or more templates from the plurality of templates which have the qualities that are greater than a predetermined threshold; and
    retaining the identified one or more templates.

11. The method of claim 1, further comprising computing a quality of the recognized key words based on recognized text in the recognized key words.

12. The method of claim 11, further comprising, if the quality of the recognized key words is greater than a threshold value, exporting the recognized text.

13. The method of claim 1, wherein the plurality of templates comprises at least one preexisting template.

14. The method of claim 1, further comprising creating at least one of the plurality of templates based on at least one of the reference objects.

15. The method of claim 1, further comprising recognizing the electronic image of the document using the selected template.

16. A system comprising:
    a processor device to:
        acquire an electronic image of a document with a fixed structure, wherein the fixed structure comprises field names and field values corresponding to the field names, and wherein the field names and the field values are located at set locations in the document;
        recognize key words in the electronic image of the document, wherein the key words comprise the field names and the field values;
        match one or more templates from a plurality of templates with the document, wherein the one or more templates comprise reference objects that specify areas in the electronic image of the document where permitted field values corresponding to field names are to be extracted, and wherein, to match the one or more templates, the processor device is further to match the field names and the permitted field values from the one or more templates with the identified field names and the field values from the recognized key words;
        select a template from the one or more templates based on a quality of a match between the field names and the permitted field values from the template with the identified field names and the field values from the recognized key words; and extract the field values from the electronic image of the document using the selected template.

17. The system of claim 16, wherein the processor device is further to perform a distortion correction of the electronic image of the document.

18. The system of claim 17, wherein, to perform the distortion correction, the processor device is to perform at least one of alignment of lines in the electronic image of the document, correction of skewing in the electronic image of the document, correction of geometry in the electronic image of the document, color correction in the electronic image of the document, restoration of blurred and unfocused areas in the electronic image of the document, and removal of noise from the electronic image of the document.

19. The system of claim 17, wherein, to perform the distortion correction, the processor device is to identify boundaries within the electronic image of the document.

20. The system of claim 19, wherein the processor device is further to crop the electronic image along the identified boundaries.

21. The system of claim 16, wherein the processor device is further to apply at least one filter to the electronic image of the document.

22. The system of claim 16, wherein the processor device is further to determine a type of the document based on the selected template.

23. The system of claim 16, wherein the reference objects comprises regular expressions.

24. The system of claim 16, wherein the processor device is to recognize the key words in the electronic image of the document based on additional information about the recognized key words.

25. The system of claim 16, wherein the processor device is further to:
compute qualities of matches between the field names and the permitted field values from the one or more templates and the identified field names and the field values from the recognized key words;
identify the one or more templates from the plurality of templates which have the qualities that are greater than a predetermined threshold; and
retain the identified one or more templates.

26. The system of claim 16, the processor device is further to compute the quality of the recognized key words based on recognized text in the recognized key words.

27. The system of claim 26, wherein, if the quality of the recognized key words is greater than a threshold value, the processor device is further to export the recognized text.

28. The system of claim 16, wherein the plurality of templates comprises at least one preexisting template.

29. The system of claim 16, wherein the processor device is further to create at least one of the plurality of templates based on at least one of the reference objects.

30. The system of claim 16, wherein the processor device is further to recognize the electronic image of the document using the selected template.

31. A computer-readable storage medium having instructions stored therein that, when executed by a processor device, cause the processor device to:
acquire an electronic image of a document with a fixed structure, wherein the fixed structure comprises field names and field values corresponding to the field names, and wherein the field names and the field values are located at set locations in the document;
recognize key words in the electronic image of the document, wherein the key words comprise the field names and the field values;
match one or more templates from a plurality of templates with the document, wherein the one or more templates comprise reference objects that specify areas in the electronic image of the document where permitted field values corresponding to field names are to be extracted, and wherein, to match the one or more templates, the processor device is further to match the field names and the permitted field values from the one or more templates with the identified field names and the field values from the recognized key words;
select, by the processor device, a template from the one or more templates based on a quality of a match between the field names and the permitted field values from the template with the identified field names and the field values from the recognized key words; and
extract the field values from the electronic image of the document using the selected template.

32. The computer-readable storage medium of claim 31, wherein the instructions are further to cause the processor device to perform a distortion correction of the electronic image of the document.

33. The computer-readable storage medium of claim 32, wherein, to perform the distortion correction, the instructions are to cause the processor device to perform at least one of alignment of lines in the electronic image of the document, correction of skewing in the electronic image of the document, correction of geometry in the electronic image of the document, color correction in the electronic image of the document, restoration of blurred and unfocused areas in the electronic image of the document, and removal of noise from the electronic image of the document.

34. The computer-readable storage medium of claim 32, wherein, to perform the distortion correction, the instructions are to cause the processor device to identify boundaries within the electronic image of the document.

35. The computer-readable storage medium of claim 34, wherein the instructions are further to cause the processor device to crop the electronic image along the identified boundaries.

36. The computer-readable storage medium of claim 31, wherein the instructions are further to cause the processor device to apply at least one filter to the electronic image of the document.

37. The computer-readable storage medium of claim 31, wherein the instructions are further to cause the processor device to determine a type of the document based on the selected template.

38. The computer-readable storage medium of claim 31, wherein the reference objects comprise regular expressions.

39. The computer-readable storage medium of claim 31, wherein the instructions are to cause the processor device to recognize the key words in the electronic image of the document based on additional information about the recognized key words.

40. The computer-readable storage medium of claim 31, wherein the instructions are further to cause the processor device to:
compute qualities of matches between the field names and the permitted field values from the one or more templates and the identified field names and the field values from the recognized key words;

identify the one or more templates from the plurality of templates which have the qualities that are greater than a predetermined threshold; and retain the identified one or more templates.

41. The computer-readable storage medium of claim 31, wherein the instructions are further to cause the processor device to compute the quality of the recognized key words based on recognized text in the recognized key words.

42. The computer-readable storage medium of claim 41, wherein, if the quality of the recognized key words is greater than a threshold value, the instructions are further to cause the processor device to export the recognized text.

43. The computer-readable storage medium of claim 31, wherein the plurality of templates comprises at least one preexisting template.

44. The computer-readable storage medium of claim 31, wherein the instructions are further to cause the processor device to create at least one of the plurality of templates based on at least one of the reference objects.

45. The computer-readable storage medium of claim 31, wherein the instructions are further to cause the processor device to recognize the electronic image of the document using the selected template.

\* \* \* \* \*